May 18, 1926.

J. A. STREUN 1,585,131

HULLING AND CLEANING FEEDER FOR COTTON

Filed Jan. 19, 1925

John A. Streun, Inventor

By Jesse R. Stone

Attorney

Patented May 18, 1926.

1,585,131

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS, A CORPORATION OF TEXAS.

HULLING AND CLEANING FEEDER FOR COTTON.

Application filed January 19, 1925. Serial No. 3,418.

My invention relates to improvements in feeders for cotton gins adapted to eliminate the hulls and other trash from the seed cotton before it reaches the gin.

It is an object of the invention to provide an apparatus whereby the cotton may be thoroughly cleaned of hulls and trash, and fed to the gin in an even and continuous flow.

It is another object to provide an apparatus for eliminating the hulls and trash from the cotton in the most efficient manner, and to construct the apparatus in compact form.

Figure 1:
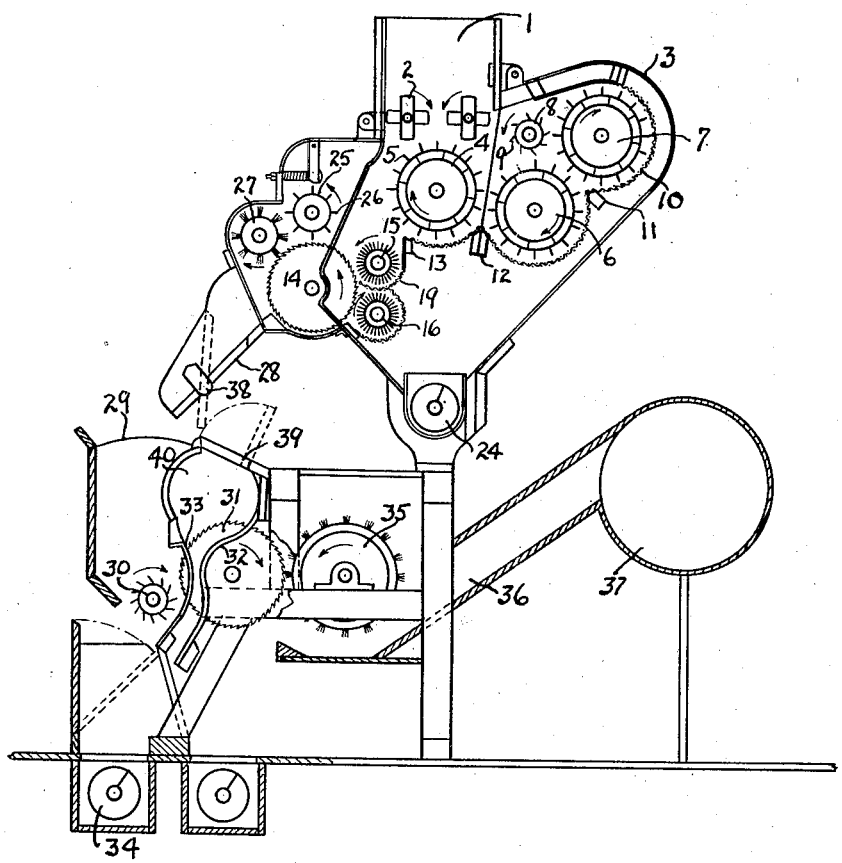
Figure 2:
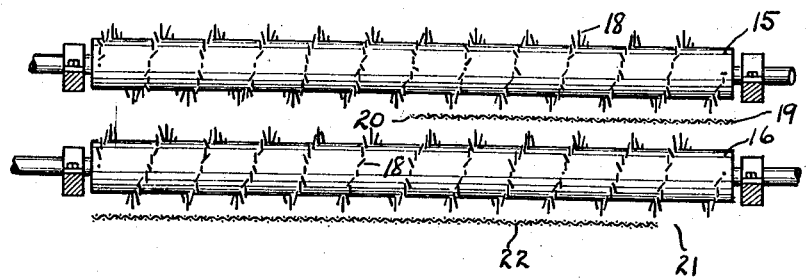

The invention resides in the peculiar arrangement and combination of the elements which make up the cleaning feeder, as will be more particularly described in the specification which follows:

Referring to the drawings herein, Fig. 1 is a side elevation of my improved device, the side wall of the housing about the parts of the device being removed for clearness. Fig. 2 is a detail of two feeding conveyor rolls employed in connection with the device. Like numerals of reference are applied to like parts in all the views.

In preparing cotton for ginning, it must be understood that cotton comes to the gin in various conditions, some of it being comparatively clean and some of the cotton on the other hand is not only dirty, but is apt to be damp and some of the bolls not completely open. It is necessary therefore to provide an apparatus by means of which the different grades and conditions of cotton may be handled so that it may be fed to the gin in as nearly clean condition as possible.

In my device the cotton is fed to the cleaner through a hopper 1. From there it passes downwardly between two feeding rollers 2 which are spaced slightly apart and rotate in opposite directions to carry the cotton downwardly between them in a smooth even bat. These rollers 2, as well as the other rollers and cylinders, are housed within a casing 3. Below the rollers 2 within the casing is a picker cylinder 4 which is journalled in the casing for rotation in a clockwise direction, as shown by the arrow. It has on its surface a series of pins or spikes 5 which, because of the rapid rotation of the cylinder, catch the lower edge of the bat of cotton fed thereto by the rollers and throw it to the right upon the cylinder 6. This cylinder is in construction similar to the cylinder 4, and rotates in the same direction. Above the cylinder 6, and to the rear thereof, is a third picker cylinder 7 also rotatable in the same direction. Above the cylinder 6, and in front of the cylinder 7, is an agitator roller 8 of somewhat smaller diameter and having the teeth 9 thereon inclined forwardly in the direction of rotation. The peripheral speed of the roller 8 is less than that of the cylinders, and tends to slightly retard and distribute more evenly the locks or wads of cotton coming thereto from the cylinder 4. It will be noted therefore that the cotton will pass between the roller 8 and the cylinder 6 and upwardly over the cylinder 7, and will be then carried down beneath the cylinders to the forward side of the machine.

Beneath the three cylinders just described, and within the casing 3, is a foraminated screen 10 which is supported upon spaced supporting bars 11 and 12 extending transversely of the casing of the housing. The screen thus conforms to the curve of the cylinders and is spaced closely thereto so that the cotton is rubbed over the screen as it is brought under the cylinders, thus allowing the separating out of the dirt and trash carried by the cotton. The screen 10 extends forwardly toward the supporting bar 13 from which point the cotton is fed to the saw 14. The said saw 14 is positioned toward the forward side of the housing 3 and has its surface provided with saw teeth inclined forwardly in the direction of its rotation, and as shown in Fig. 1, it is adapted to rotate in a counter clockwise direction. Between the cylinder 4 which delivers the cotton toward the saw 14 and the said saw, are two superimposed conveyor rolls 15 and 16. As will be noted these rolls rotate in opposite directions, the upper one turning in a counter clockwise direction, and the lower one in a clockwise direction. Each of the said conveyor rolls has thereon a spiral row of spikes or pins 18 which project approximately radially from the roll, as shown in Fig. 2. I have altered the radial position of the spikes so that they will not only be arranged spirally of the roller upon which they are mounted, but will be inclined laterally in a direction longitudinally of the roll. I contemplate that some of the spikes will be bent toward one end of the roll and others bent toward the opposite end of the roll so that they will have the effect of a zigzag line spirally about the roll. This inclination of the spikes upon the conveyor has been found to be an improved factor in feeding the cotton to the saw. It has the effect during the rotation of the rolls to catch the lint of the seed cotton and carry it directly on the saw, but it will not catch the hulls and chaff in the same manner.

Below the upper roll 15 is a trough 19 of screen or other foraminated material, and this trough extends from one end to a point approximately midway of the length of the roller. The roller is adapted to rotate in a direction to carry the cotton from the right to the left in Fig. 2 so that it will pass from the upper roller downwardly at 20 upon the lower roller 16. As this lower roller 16 rotates in the opposite direction, it will carry the cotton backwardly across the face of the saw again, and such hulls as are eliminated will be discharged at 21 at the opposite end of the lower screen 22 which forms a trough as in the case of the screen 19. The hulls thus discharged at 21 may be received upon a lower screw conveyor 24 and carried out of the machine. The purpose of these conveyor rollers 15 and 16 is to pass the cotton back and forth across the face of the saw 14 so that all of the lint may be carried away by the saw and such hulls as are free from the cotton are eliminated, as just described.

The saw 14 carries the seed cotton around over its upper surface and tends to discharge it toward the forward end of the machine. Directly above the saw cylinder is a roller 25 provided with a series of radial flights thereon which, because of the rotation of the said roll in the same direction as the saw, will tend to strike the bolls of cotton and the hulls which tend to follow the lint, and throw them back upon the conveyor roll 15.

The cotton is carried on beneath the roll 25 and is brushed from the teeth of the saw by a rapidly rotating brush roll 27. The cotton thus freed from the saw is discharged through a chute 28 to the gin 29.

It will be understood that the cotton coming from the cleaner after being treated in the manner just described, will be practically free of trash, and very few of the hulls will remain with the cotton. I have provided however for further treating the seed cotton to eliminate such hulls as may have passed through the cleaner in the manner described. For his purpose I provide about midway of the gin breast and immediately in front of the gin saw, a spiked huller roll 30. The gin saws 31 adjacent the huller roll are adapted to catch the lint of the cotton and draw the cotton upwardly over the gin saw and between ribs 32 to eliminate the seed from the cotton in the usual manner. I have provided additional ribs 33 between the huller roll 30 and the ribs 32. Said ribs 33 are spaced somewhat further apart than the ginning ribs, but are intended to prevent the passage of the hulls from the cotton before it is ginned. The purpose therefore of the huller roll 30 is to thoroughly beat up and agitate the cotton being fed to the gin saws and allow the saws to carry the cotton and hulls against the ribs 33 and eliminate the hulls so that they may drop downwardly and be passed to a conveyor roll 34 by means of which they may be carried away.

The construction of the gin is not intended to show anything of novelty. There is a brush roll 35 at the rear of the gin saw to remove the cotton lint from the saw and throw it backwardly into a chute 36 through which it is drawn by suction or other means to a discharge pipe 37. The seeds which are eliminated at the ribs 32 are adapted to drop downwardly and be conveyed off.

If the cotton being handled by the cleaner is in good shape, it will be quite thoroughly clean before it reaches the gin press and will not need to be further agitated by the roller 30. I have therefore arranged the chute 28 so that it may be pivoted at 38 and thus be swung upwardly into dotted line position allowing the cotton to drop directly to the gin saws. It is also necessary to arrange the upper wall 39 of the gin proper so that it may swing upwardly as shown in dotted lines to allow the cotton to pass directly into the roll box 40 and be carried directly to the gin saws.

It is believed that the operation of the device has been clearly set forth. The cotton is first torn off into a loose layer and is distributed evenly for the full length of the picker rollers 4, 6 and 7, and when thus loosened and evenly distributed, is carried over the screen 10 so that most of the loose dirt and chaff may be rubbed out and allowed to drop downwardly to the conveyor 24. When thus freed of the loose dirt and chaff the hulls are eliminated largely by the passage of the cotton longitudinally of the agitator saw 14 which carries away the seed cotton and lint, leaving the hulls to be discharged from the conveyor rolls 15 and 16 to the lower side of the housing where they are carried off by the conveyor 24. The roll 25 acts as a baffle to prevent the passage of hulls and unopened bolls from the cleaner, throwing them back to be again passed along the agitator saw 14. In this way the cotton is not only freed from the usual dirt and trash but the hulls are also carried away so that the gin may much more thoroughly and rapidly perform the ginning operation. If the cotton is not thoroughly cleaned because of its condition, it may be further acted upon by the huller roll 30, as previously described.

The advantages of this device will be now clearly understood by those skilled in the art without further description.

What I claim as new and desire to protect by Letters Patent is:

1. In a device of the character described, cotton feeding rolls, a series of picker cylinders having screens below them for separating the dirt and chaff from the cotton, a saw cylinder, conveyor rolls in superimposed position adjacent said saw cylinder, spikes on said conveyor rolls arranged spirally thereon and bent laterally toward the ends of the said rolls, whereby the cotton may be moved along said saw cylinder and the hulls removed therefrom, and means to brush the cotton from said saw cylinder.

2. In a device of the character described, a series of picker cylinders, means to feed cotton thereto, means to break up the cotton in its passage on said cylinders, a saw cylinder, a conveyor roll adjacent said saw cylinder, spikes on said conveyor roll arranged spirally thereon and bent laterally in the longitudinal direction of said roll, a screen beneath said roll, adapted to allow the discharge of hulls at one end thereof, means to prevent the carrying away of hulls by said saw cylinder, and means to remove cotton from said saw cylinder.

3. In a device of the character described, a series of cleaner cylinders having a screen on the lower side thereof, means to break up and distribute the cotton over these cylinders, a saw cylinder to which the cotton is fed from the cleaner cylinders, a plurality of conveyor rolls adjacent said saw cylinder adapted to move the cotton and hulls longitudinally of said saw, spikes on said conveyor cylinders bent in a direction longitudinally of said rolls, a roll above said saw cylinder having flights thereon to resist the passage of hulls over said saw cylinder, and means to remove the cotton from said saw cylinder.

4. In a device of the character described, a housing, means therein to remove the dirt and chaff from the cotton, a saw cylinder, superimposed conveyor rolls between said cleaner means and said cylinder, said rolls having spikes thereon arranged to convey the cotton and hulls longitudinally of said saw, said spikes being bent in opposite directions longitudinally of the rolls, means to remove the cotton from said saw cylinder, and a huller roll for breaking up and agitating the cotton, and ribs adjacent said roll to separate the hulls from said cotton.

In testimony whereof I hereunto affix my signature this 28th day of January A. D 1926.

JOHN ARNOLD STREUN.